United States Patent
Hays et al.

(10) Patent No.: US 12,541,542 B2
(45) Date of Patent: Feb. 3, 2026

(54) HYBRID AI ARCHITECTURE FOR NATURAL LANGUAGE QUERY

(71) Applicant: Microsoft Technology Licensing, LLC, Redmond, WA (US)

(72) Inventors: Christopher A. Hays, Monroe, WA (US); Aaron S. Meyers, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/498,029

(22) Filed: Oct. 30, 2023

(65) Prior Publication Data
US 2025/0139138 A1    May 1, 2025

(51) Int. Cl.
| | |
|---|---|
| *G06F 16/33* | (2025.01) |
| *G06F 16/3329* | (2025.01) |
| *G06F 16/334* | (2025.01) |
| *G06F 16/338* | (2019.01) |
| *G10L 15/16* | (2006.01) |
| *G10L 15/183* | (2013.01) |

(52) U.S. Cl.
CPC ...... *G06F 16/3329* (2019.01); *G06F 16/3344* (2019.01); *G06F 16/338* (2019.01); *G10L 15/16* (2013.01); *G10L 15/183* (2013.01)

(58) Field of Classification Search
CPC ............ G06F 16/3329; G06F 16/3344; G06F 16/338; G10L 15/16; G10L 15/183
See application file for complete search history.

(56) References Cited

U.S. PATENT DOCUMENTS

| | | |
|---|---|---|
| 8,184,797 B1 | 5/2012 | Rosen |
| 11,055,355 B1 | 7/2021 | Monti et al. |
| 11,580,145 B1 | 2/2023 | Kumar et al. |
| 2019/0042988 A1 | 2/2019 | Brown et al. |
| 2020/0193286 A1 | 6/2020 | Byrnes et al. |

(Continued)

FOREIGN PATENT DOCUMENTS

CN    105528349 B    2/2019

OTHER PUBLICATIONS

"Expert.ai Natural Language Technologies", Retrieved From: https://www.expert.ai/products/core-natural-language-technologies/, Retrieved From: Sep. 6, 2023, 8 Pages.

(Continued)

*Primary Examiner* — Apu M Mofiz
*Assistant Examiner* — Cindy Nguyen
(74) *Attorney, Agent, or Firm* — Barta Jones, PLLC

(57) ABSTRACT

Example solutions perform natural language query processing on hybrid utterances. A precise segment is identified, within the hybrid utterance, and processed with a symbolic AI interpreter configured to generate a first interpretation. The precise segment is replaced, within the hybrid utterance, with a placeholder term thereby resulting in a vague utterance. The vague utterance is processed with a statistical AI interpreter configured to generate a second interpretation. The first interpretation is merged with the second interpretation using the hybrid utterance as a template for the merger and using the placeholder term as the location for the first interpretation within the second interpretation. A complete interpretation is generated and transmitted to a query generator.

20 Claims, 5 Drawing Sheets

(56) References Cited

U.S. PATENT DOCUMENTS

| | | | |
|---|---|---|---|
| 2020/0387551 A1* | 12/2020 | Hays | G06F 16/36 |
| 2021/0173829 A1 | 6/2021 | Zeng et al. | |
| 2022/0121656 A1 | 4/2022 | Zheng et al. | |
| 2022/0129450 A1 | 4/2022 | Cao et al. | |
| 2022/0217451 A1 | 7/2022 | Giladi et al. | |

OTHER PUBLICATIONS

Kapanipathi, et al., "Leveraging Abstract Meaning Representation for Knowledge Base Question Answering", In repository of arXiv:2012.01707v2, Jun. 2, 2021, 11 Pages.

Li, et al., "Graphix-T5: Mixing Pre-Trained Transformers with Graph-Aware Layers for Text-to-SQL Parsing", In repository of arXiv:2301.07507v1, Jan. 18, 2023, 10 Pages.

Roukos, et al., "Getting AI to reason: Using Neuro-symbolic AI for Knowledge-based Question Answering", Retrieved From: https://research.ibm.com/blog/ai-neurosymbolic-common-sense, Dec. 4, 2020, 10 Pages.

Sagar, Ritika, "What is Hybrid AI?", Retrieved From: https://analyticsindiamag.com/what-is-hybrid-ai/, Jul. 21, 2021, 19 Pages.

Su, et al., "Improving Multi-turn Dialogue Modelling with Utterance ReWriter", In repository of arXiv:1906.07004v1, Jun. 14, 2019, 10 Pages.

Wolfram, Stephen, ChatGPT Gets Its "Wolfram Superpowers", Retrieved From: https://writings.stephenwolfram.com/2023/03/chatgpt-gets-its-wolfram-superpowers/, Mar. 23, 2023, 30 Pages.

Dar, et al., "Frameworks for Querying Databases Using Natural Language: A Literature Review", arXiv:1909.01822v1, Dec. 31, 2019, pp. 1-18.

Giordani, et al., "Translating Questions to SQL Queries with Generative Parsers Discriminatively Reranked", Proceedings of Coling, Dec. 31, 2012, pp. 401-410.

International Search Report and Written Opinion received for PCT Application No. PCT/US2024/050295, Dec. 17, 2024, 15 pages.

* cited by examiner

HYBRID AI ARCHITECTURE FOR NATURAL LANGUAGE QUERY

BACKGROUND

Natural language query (NLQ) systems are computer systems that facilitate user interaction with a data source (e.g., a database, information repository, knowledge base) using queries or questions in a natural human language (e.g., English, French, German, or the like). The primary goal of such a system is to enable users to retrieve information, seek answers, or perform specific tasks by expressing their needs in human language (an "utterance," whether written or spoken) rather than requiring them to use a specific query language or structured commands. For example, in the context of an enterprise sales database, a user might input a query: "What are the top five Chicago customers by total wine sales last week?" As such, the NLQ system may translate the natural language utterance into a structured computer query that is then applied to the target data source.

Historically, this translation process has used one of two competing technologies, either a symbolic artificial intelligence (AI) interpreter or a statistical AI interpreter. Symbolic AI interpreters attempt to solve this translation problem using computational linguistic techniques such as tokenization, lemmatization, syntactic parsing, or semantic interpretation, along with algorithmic structured query generation. Statistical AI interpreters attempt to solve the translation problem using statistical AI techniques such as deep neural networks or large language models (LLMs).

Symbolic AI approaches and statistical AI approaches to NLQ each have their own strengths and weaknesses. Symbolic AI typically provides highly predictable and consistent results, where the specific reasoning behind choices made in the interpretation are both explainable and easily configurable by users of the system. Further, symbolic AI generally performs exceptionally well at translating precisely worded questions of varying complexities into correct structured computer queries. Where they tend to fall short, however, is in dealing with poor syntax, unexpected terminology, and vague or imprecisely worded utterances that require a significant amount of inference or complex clarification.

Some statistical AI approaches (particularly LLMs), on the other hand, perform quite well at handling human-guided complex clarification and inference, as well as adapting to novel vocabulary and unusual syntactic structures. Their inherent flexibility, however, comes with some downsides. Namely, statistical AI approaches are, by their nature, less predictable, less consistent, difficult to customize, and lack the capacity to explain how their answers were derived. In addition, as has been seen in recent years with LLM "hallucinations," the reliability and correctness of such systems can vary widely from utterance to utterance.

SUMMARY

The disclosed examples are described in detail below with reference to the accompanying drawing figures listed below. The following summary is provided to illustrate some examples disclosed herein. The following is not meant, however, to limit all examples to any particular configuration or sequence of operations.

Example solutions for performing natural language query processing on hybrid utterances include: receiving a hybrid utterance, the hybrid utterance being a natural language query request for data from a data source; identifying, within the hybrid utterance, a first precise segment: processing the first precise segment with a symbolic artificial intelligence (AI) interpreter that is configured to generate a first interpretation: replacing the first precise segment, within the hybrid utterance, with a placeholder term, thereby resulting in a first vague utterance: processing the first vague utterance with a statistical AI interpreter that is configured to generate a second interpretation: merging the first interpretation with the second interpretation, the merge using the hybrid utterance as a template for the merge and using the placeholder term as location for the first interpretation within the second interpretation, thereby generating a complete interpretation; and transmitting the complete interpretation to a query generator, the query generator being configured to generate at least one database query for the data source to generate query results that are displayed in response to the natural language query request.

BRIEF DESCRIPTION OF THE DRAWINGS

The disclosed examples are described in detail below with reference to the accompanying drawing figures listed below.

Corresponding reference characters indicate corresponding parts throughout the drawings. Any of the drawings may be combined into a single example or embodiment.

DETAILED DESCRIPTION

Figure 1:
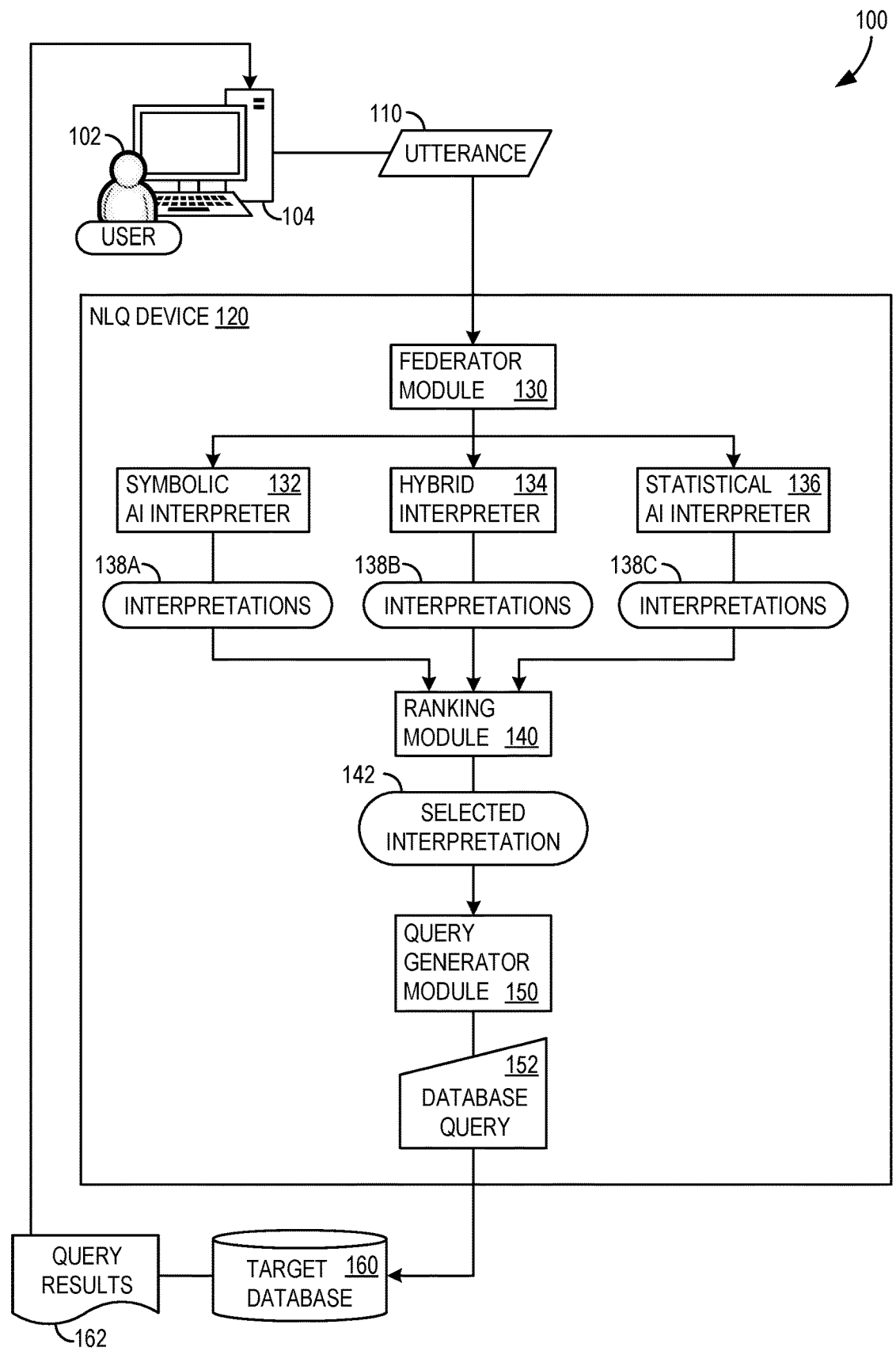
FIG. 1 illustrates an example architecture of a natural language query (NLQ) system that advantageously provides natural language query processing for precise, vague, and hybrid utterances.

Some natural language query (NLQ) systems have attempted to leverage both statistical and symbolic approaches, either via a simple federation or via use of statistical artificial intelligence (AI) as an application programming interface (API). Under simple federation, a symbolic AI NLQ system and a statistical AI NLQ system are executed in parallel with one another, and an up-front classifier is provided that chooses which NLQ system to use for any given utterance, or via a post-processing scoring mechanism to select which of the competing results is more likely to be correct. However, there are at least two downsides to the simple federation approach. First, both the up-front classifier and the post-processing scoring techniques are fragile and unreliable because they need to predict/evaluate the behaviors of two radically different systems. Second, federation does nothing to account for hybrid questions (e.g., utterances that have some precise components and some vague components).

Under some more recent approaches, a statistical AI manages the translation of utterances and has the ability to call out to a symbolic AI as a subsystem for parts of the utterance that could likely be processed symbolically. While this approach accounts for some hybrid utterances, it does so at the cost of predictability, as the application of precise understanding via symbolic AI is left to the whims and caprices of the statistical AI system.

These existing solutions produce inferior results, leading to users having to reformulate and resubmit their queries, thereby wasting computational processing, storage, and network bandwidth.

In contrast, in some examples, an NLQ system described herein provides a hybrid approach that leverages the strengths of both statistical AI approaches and symbolic AI approaches, utilizing each to mitigate the weaknesses of the other. The NLQ system includes a federator module that utilizes a symbolic AI interpreter to process precise queries, a statistical AI interpreter to process vague queries, and a hybrid interpreter that handles queries that contain some combination of precise query components and vague query components.

Upon receipt of a new utterance (e.g., a natural language-formatted query provided by a user), the federator module evaluates the utterance to determine how to process that utterance. For utterances that are purely precise queries (e.g., where all sub-components of the utterance can be precisely mapped to specific components of the target data source(s)), the federator module directs those utterances to the symbolic AI interpreter for processing. For utterances that are purely vague queries (e.g., have no sub-components that can be precisely mapped to specific components of the target data source(s)), the federator module directs those utterances to the statistical AI interpreter for processing. For utterances that include some precise sub-components and some vague sub-components ("hybrid utterances"), the federator module directs those hybrid utterances to the hybrid interpreter for processing.

The hybrid interpreter parses the hybrid utterance into precise sub-components ("partial precise utterance(s)") and vague sub-components ("partial vague utterance(s)"). The partial precise utterances are processed by the symbolic AI interpreter to generate precise interpretation(s) ("partial precise interpretation(s)") (e.g., portions of a database query that precisely map to particular data components). To address the vague sub-components of the utterance, the hybrid interpreter includes an utterance rewriter module that distills out the precise components from the full utterance (e.g., as they will be addressed by the symbolic AI interpreter) and rewrites the utterance into a "reduced utterance" (e.g., a purely vague utterance). This reduced utterance is processed by the statistical AI interpreter to generate "reduced utterance interpretation(s)." Both the partial precise interpretation(s) and the reduced utterance interpretation(s) are sent, along with the original utterance, to an interpretation merger module. The interpretation merger module combines the partial precise interpretation(s) with the reduced utterance interpretation(s), using the original utterance as the template for the recombination. This merge results in one or more "complete interpretations," each of which represents a more refined form of the utterance tailored to the target data source based on the original natural language utterance.

These complete interpretations may then be sent to a ranking module that scores each interpretation based on a likelihood to correctly represent the intent of the utterance. The highest ranked interpretation(s) are sent to a query generator module that converts the chosen interpretation into a database query specific to the target data source. This database query is sent to the target data source to generate a set of output that may be sent to the user for display.

In some examples, the NLQ system also provides an utterance rewriter module that uses an LLM in combination with linguistic metadata of the target data source to rewrite purely vague utterances into precise utterances. The utterance rewriter module may engage the user in dialog (e.g., suggesting clarifications, requesting user input). To target utterances that the symbolic AI interpreter is likely to be able to handle, the LLM is primed using linguistic information about the target data source and built-in system capabilities as context (e.g., database schema, data instance term information matched from the utterance, vocabulary corresponding to core system capabilities of the symbolic AI interpreter, and the like). The LLM thus generates one or more "candidate precise utterance(s)" that can be sent to the symbolic AI interpreter for processing. In such situations where the linguistic metadata can be used to rewrite the vague utterances into precise utterances, these precise utterances are then processed by the symbolic AI interpreter to generate interpretations (e.g., in lieu of the statistical AI interpreter). The linguistic metadata associated with the target data source may also used by the symbolic AI interpreter to interpret each of the precise utterances generated by the LLM.

Example solutions use NLQ processing techniques to improve the processing performance and outcomes of hybrid utterances. These techniques utilize both statistical AI interpreters and symbolic AI interpreters for their own strengths in interpreting purely vague utterances and purely precise utterances, respectively. The example solutions provide technical advantages over existing approaches by, for example, identifying precise segment(s) within a hybrid utterance and processing those precise segments with the symbolic AI interpreter. Further, the precise segments are replaced within the hybrid utterance to generate a purely vague utterance, and that vague utterance is then processed with the statistical AI interpreter. Each of the precise interpretations and vague interpretations are then merged to generate a complete interpretation. The example solutions improve computational processing by, for example, providing query results that are more likely to be what the user was originally requesting, because the precise portions of their queries are processed by an interpreter that is more suited to precise queries, and the vague portions of their queries are processed by another interpreter that is more suited to vague queries.

The various examples are described in detail with reference to the accompanying drawings. Wherever preferable, the same reference numbers are used throughout the drawings to refer to the same or like parts. References made throughout this disclosure relating to specific examples and implementations are provided solely for illustrative purposes but, unless indicated to the contrary, are not meant to limit all examples.

FIG. 1 illustrates an example architecture of an NLQ system 100 that advantageously provides natural language query processing for precise, vague, and hybrid utterances. In the NLQ system 100, a user 102 wishes to collect some data from a data source or model, such as the target database 160. The target database 160 may be, for example, an enterprise database storing various types of information about the operations of a business (e.g., sales data, research data, orders data, or the like). However, the user 102 may not know how to form a query for the database 160 (e.g., in the query language of the database 160) that would cause the desired results to be generated. As such, an NLQ computing device (or just "NLQ device") 120 is provided that can convert a natural language utterances (or just "utterances") 110 into queries for the target database 160 (e.g., as database queries 152).

Numerous examples are provided herein in natural human language (e.g., English). These examples use natural language to represent the original natural language-based inputs provided to the NLQ system 100 by the user 102 (e.g., as utterances 110), as these original inputs are provided in natural language (e.g., written or spoken utterances 110). Further, and for purposes of understandability, many of the examples provided herein also use natural language to represent some intermediary processing examples. It should be understood that the NLQ device 120 may implement various different natural language processing (NLP) techniques to represent the natural language utterance 110 and sufficient to perform the processing steps described herein, such as formal grammars (e.g., context-free grammars, dependency grammars, or the like), parse trees (e.g., constituency parse trees, dependency trees, or the like), part-of-speech (POS) tagging, transition-based parsing, feature structures, syntactic patterns and templates, first-order predicate logic, embeddings, or the like. While these intermediary processing steps may be internally represented by the NLQ device 120 in some NLP structure or representation that captures the semantics of some meaning of natural language terms, phrases, or sentences, the intermediary examples are presented herein in natural language to help facilitate understanding.

In the example, the NLQ device 120 provides a federator module 130 and a set of interpreters that is configured to receive and interpret a data question from the user 102. This data question is shown in FIG. 1 as utterance 110 and represents a written or spoken query in a natural language. A data question is any utterance 110 where the intent of the user is to find an answer to a specific question that they believe is answerable from the data available to the NLQ system. The terms "data question," "question," and "utterance" may be used interchangeably herein.

These questions can span from hyper-specific single-result questions like "How many Chicago customers bought more than 3 pounds of rice from store 6 last month?" to requests for particular charts such as "I want a line chart showing the trend of average sales of rice by year in store 6" to questions that require complex analysis, such as "What is the best predictor of rice sales?"

One distinguishing characteristic of a data question is the degree to which the question is precise. At one end of the spectrum are precise questions, wherein each part of the question corresponds to specific data present in (or derivable from) the target database 160. For example, the question "How many customers are in each state?" can be mapped directly to a count of rows in the customers table, grouped by the state column, and displayed in an appropriate visualization such as a map, bar chart, or list.

At the other end of the spectrum are vague questions. Vague questions are typified as questions which require analysis or interpretation that is dependent on facts or assumptions that are not necessarily present in either the question or the data. For example, the question "What is going on with sales?" does not specify what aspect of sales the user 102 wants to see. The user 102 could be interested in any number of things, such as factors that contribute to increased sales, or an analysis of outliers in sales by region, or simply a chart showing sales over time.

Whether a question is precise, vague, or somewhere in between may not be an inherent property of the question itself. Rather, such "preciseness" of the question is a factor of the relationship between the question and the content of the target database. Consider, for example, the question "What is the customer lifetime value for our most loyal customers?" In a typical sales database, this question would be vague, needing inferences regarding how to interpret what the lifetime value of each customer is (e.g., total sales, average net profit, lowest number of complaints per order) and how to quantify their loyalty (e.g. average orders per year, longest duration since first order, fewest orders placed with competitors). On the other hand, in a database where the customer table contains both a "lifetime value" column and a "loyalty" column, this question would be a precise question.

Further, it should be noted that vague questions may be different than ambiguous questions. For example, the question "Count orders by city" may be ambiguous due to ambiguity in the word "city." That term could be referring to either the customer's city, the store's city, or the delivery city. However, it would still be a precise question with three precise possible interpretations due to term ambiguity.

Questions that fall somewhere on the spectrum between purely precise questions and purely vague questions are hybrid questions. Hybrid questions decomposed, by the NLQ device 120, into a combination of precise components and vague components. For example, consider the question "What is going on with sales of discontinued products in the eastern region over the past 3 months?" This original question may be treated as a hybrid of "What is going on with sales" (which is a vague component) and "sales of discontinued products in the eastern region over the past 3 months" (which is a precise component).

How a particular data question (e.g., utterance 110) is handled by the NLQ device 120 depends on where the utterance 110 falls on the precise/vague spectrum.

In the example, the federator module 130 sends the utterance 110 to each of a symbolic AI interpreter 132, a statistical AI interpreter 136, and a hybrid interpreter 134 for processing. As such, each of these interpreters 132-136 generate interpretations 138A-138C, respectively, given the utterance 110 as input. In other examples, the federator module 130 analyzes the utterance 110 and selects which interpreter 132-136 to send the utterance 110. More specifically, the federator module 130 determines whether the utterance 110 is a purely precise question, a purely vague question, or a hybrid question (e.g., a composite question containing at least one vague component and at least one precise component). If the utterance 110 is purely precise, the federator module 130 passes the utterance 110 to a symbolic AI interpreter 132. If the utterance 110 is purely vague, the federator module 130 passes the utterance 110 to a statistical AI interpreter 136. If the utterance 110 is a hybrid question, then the federator module 130 passes the utterance 110 to a hybrid interpreter 134.

The symbolic AI interpreter 132 is an interpreter that uses explicit representations of knowledge and symbolic reasoning processes (e.g., manipulating symbols, logical reasoning, predefined rules) to understand questions posed in natural language. For example, the symbolic AI interpreter 132 may be a model that utilizes one or more of formal grammars, semantic frames, ontologies, rule-based systems, predicate logic, lambda calculus, prolog and logic programming, conceptual dependency theory, case-based reasoning, scripts and schemata, or thematic roles to generate outputs (e.g., interpretations 138A). The symbolic AI interpreter 132 is most effective at processing precise utterances (e.g., relative to the processing hybrid or vague utterances).

The statistical AI interpreter 136 is an interpreter that uses probabilistic models and data-driven techniques to interpret and understand questions posed in natural language. For example, the statistical AI interpreter 136 may utilize one or more of a statistical machine translation (SMT) model, a statistical language model (LM) (e.g., a large language model (LLM)), a recurrent neural network (RNN), a long short-term memory (LSTM) network, an attention mechanisms and transformers model (e.g., BERT, GPT), a sequence-to-sequence model, an embedding model, a pre-trained language model (e.g., GPT-3), or the like.

The hybrid interpreter 134 utilizes both the symbolic AI interpreter 132 and the statistical AI interpreter 136 to interpret and process the utterance 110. More specifically, the hybrid interpreter 134 parses the utterance 110 into precise components and vague components and then uses the symbolic AI interpreter 132 to generate intermediary interpretations for the precise components and uses the statistical AI interpreter 136 to generate intermediary interpretations for the vague components. These intermediary interpretations are then merged (e.g., combined) to generate the interpretations 138B. Additional details regarding the hybrid interpreter 134 are described below with respect to FIG. 2.

Interpretations 138A-138C represent some conversion or transformation of the utterance 110 that the NLQ system 100 can understand and act upon. In other words, the interpretations 138A-138C are possible variations on how the system 100 could interpret the utterance 110 provided by the user 102 (e.g., in the context of the target database 160). In some examples, the interpretations 138A-138C may be provided in an internal, structured representation (e.g., as a semantic representation, a non-natural-language based representation understandable by the NLQ system 100).

In this example, the input for each of the interpreters 132, 134, 136 is the utterance 110 and the interpreters 132-136 are prompted to generate interpretations 138A, 138B, 138C, respectively, when given a particular utterance 110. While the utterance 110 is a natural language input (or some syntactic representation therefrom), the interpretations 138A-138C generated by the interpreters 132-136 represent one or more variations on how the utterance 110 can be interpreted. Each interpreter 132-136 may generate zero or more interpretations 138A-138C based on a given utterance 110. Each of the generated interpretations 138A-138C include detailed semantic representations of the meaning of the utterance 110 along with metadata about the particular interpretations 138A-138C. This interpretation metadata includes a confidence level or confidence score for that particular interpretation 138A-138C and may also include data such as which words of the input utterance were recognized or understood by the interpreter 132, which words were unrecognized, was the input utterance good syntactically or good semantically, or the like (e.g., from the statistical AI interpreter 132).

In this example, each of these interpretations 138A-138C is sent to a ranking module 140. The ranking module 140 analyzes the confidence levels of each of the generated interpretations 138A-138C to identify one or more selected interpretations 142 (e.g., the highest confidence interpretation(s) of the interpretations 138A-138C generated by the interpreters 132-136). An utterance 110 that appears to be a precise data question can be interpreted with respect to the target database 160. However, such resulting interpretations can vary significantly in the degree of confidence that the system's understanding is correct. If the interpretation 138A is of high confidence, an answer based on the precise interpretation is provided to the user. Note that the NLQ device may ask for clarification in the case of ambiguity (e.g. "count orders by name"). If the interpretation 138A is of medium confidence, an answer based on the precise interpretation 138A is treated as a candidate possible answer. In addition, the utterance 110 is interpreted as if it were a vague or hybrid data question (e.g., via interpretations 138B, 138C). Either (or both) candidate answers may be provided to the user, based on relative confidence. If the precise interpretation 138A is low confidence, the utterance is treated as a vague or hybrid data question. Exceptionally low-scoring utterances 110 can immediately be treated as out of domain questions (e.g., with no answer provided).

Upon identifying the selected interpretation 142, the NLQ device 120 uses a query generator module 150 to generate one or more database queries 152 based on the selected interpretation 142. These database queries 152 are sent to the target database 160 to generate query results 162 that are then displayed to the user 102 (e.g., causing the query results 162 to be displayed via user computing device 104). As such, the NLQ device 120 has taken an utterance 110 from the user 102 in a natural language and generated query results 162 from the target database 160 based on that utterance 110.

While the example architecture of the NLQ system 100 shown in FIG. 1 provides numerous components within the NLQ device 120 (e.g., with a single device providing the various functionalities described herein), it should be understood that other architectures are possible. For example, any or all of the interpreters 132-136 may be provided by other devices or systems (e.g., as independent models or the like, via third party LLMs and APIs, executed on user computing devices 104, and so forth).

Figure 2:
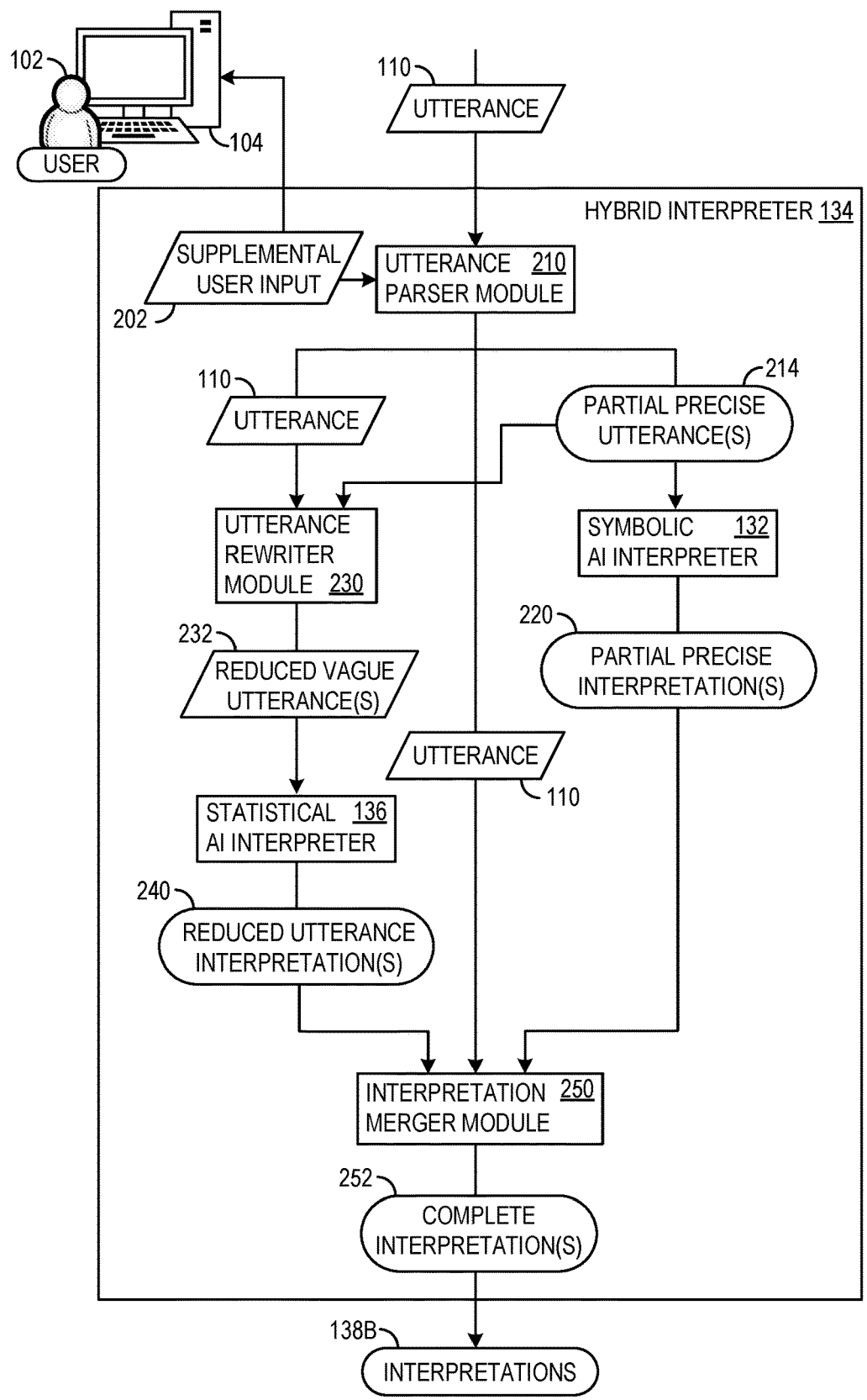
FIG. 2 is a diagram illustrating component-level details and dataflow within example hybrid interpreters, such as that of FIG. 1.

FIG. 2 is a diagram illustrating component-level details and dataflow within the example hybrid interpreter 134 of FIG. 1. While the statistical AI interpreter can be used directly convert vague utterances into target queries (with varying degrees of success), such an approach may not achieve the goals of predictability, explainability, and control. To achieve these goals, an utterance 110 that is purely vague or otherwise includes a vague component is converted by the hybrid interpreter 134 into one or more candidate precise utterances for the NLQ system 100 to evaluate.

For example, the vague question "What is going on with sales?" may be converted into one or more of precise candidate questions "What are sales over time?", "Show outliers for sales by region", and "What factors most affect total sales?" The process for constructing the candidates may involve asking the user 102 for clarifications, such as "What contributes to a customer being important?" Vague questions that require out-of-domain knowledge or data may not be answered by the hybrid interpreter 134.

The processing of the hybrid utterances by the hybrid interpreter 134 involve the vague and precise parts being handled separately and their respective results being combined. In cases where the vague utterance has high confidence precise parts, the precise parts can be interpreted and the vague utterance can be rewritten in a simplified form to be intermediately interpreted as a purely vague utterance.

For example, in the data question "Why aren't green products that weigh over 10 kg selling very well?", the "green products that weigh over 10 kg" portion may have a high confidence precise interpretation. The remaining "Why aren't some products selling very well?" may then be processed as a purely vague utterance, perhaps being converted into the precise question "What factors most affect total sales of products?" The queries generated for these two questions can then be combined into a final result.

Precise data questions with vague parts can similarly be decomposed and recombined. For example, in the question "Which employees sold products that are good for the company to Chicago customers", the span "products that are good for the company" can be processed as a vague utterance, the results of which are combined with the query resulting from the simplified precise utterance "Which employees sold products to Chicago customers".

To accomplish the functional goals outlined herein, the hybrid interpreter 134 combines the capabilities of both the symbolic AI interpreter 132 (e.g., for precise components) and the statistical AI interpreter 136 (e.g., for vague components). The precise understanding provided by the symbolic AI interpreter 132 provides deterministic and customizable understanding for precise questions, while the statistical AI interpreter 136 (e.g., via use of an LLM or the like) is leveraged to guide users 102 from vague to precise intents as well as broaden language coverage when there are gaps in system capabilities or linguistic metadata. The architecture of this NLQ system 100 beth encourages users 102 to express precise intents while also teaching them how to do so.

More specifically, in the example, the hybrid interpreter 134 receives the utterance 110 (e.g., from the federator module of FIG. 1). Presume the original utterance 110, as received from the user computing device 104 of the user 102, is the question: "Which discontinued products under $30 should we restock in Chicago stores?" This utterance 110 includes one or more precise components and one or more vague components.

The hybrid interpreter 134 includes an utterance parser module 210 that initially inspects the original utterance 110 and identifies at least the precise components or segments of the utterance 110. The precise components of the original utterance 110 are identified in FIG. 2 as partial precise utterances 214. These partial precise utterances 214 represent segments of the original utterance 110 that can generate high confidence scores of precise interpretations. In some examples, the utterance parser module 210 uses a symbolic AI interpreter (e.g., similar to the symbolic AI interpreter 132) in conjunction with linguistic metadata about the target database 160 (such as the linguistic metadata 322 shown in FIG. 3) to interpret the utterance 110 to identify which segments of the utterance 110 are understood (e.g., able to be recognized as the partial precise utterances 214 based on the linguistic metadata about the target database 160) and which segments are not (e.g., the remaining segments of the utterance 110).

With this example utterance 110, the segments of the utterance 110 that are identified by the utterance parser module 210 as partial precise utterances 214 are the segments "discontinued products under $30" and "Chicago stores," as each of these segments can be precisely mapped to components of the target database 160. More specifically, and for example, the "discontinued products under $30" segment represents a subset of products from the target database 160 (e.g., from a products table that identifies individual products and includes a discontinued status field and a price field). The "Chicago stores" segment represents a subset of stores from the target database 160 (e.g., from a stores table that identifies zip codes of each store, in conjunction with a zip codes table that identifies state, city, municipality, or the like, for each zip code).

In some examples, the hybrid interpreter 134 solicits the user 102 for supplemental user input 202 (e.g., to clear up ambiguities in partial precise utterances 214). For example, the segment "Chicago stores" may be ambiguous as to scope. One interpretation can mean "all stores within the city limits of the city of Chicago, Illinois," where another interpretation can mean "all stores within the 'Chicago-land' area" (e.g., Chicago and surrounding suburbs, or some predefined region including Chicago and surrounding areas). As such, hybrid interpreter 134 may identify such ambiguities and prompt the user 102 to select one of the possible interpretations or otherwise refine the partial precise utterance to clear up the perceived ambiguity (e.g., with more explicit language).

Given the identification of the partial precise utterances 214, as well as the original utterance 110, the hybrid interpreter 134 also includes an utterance rewriter module 230 that is configured to distill out the precise segments from the original utterance 110, rewriting that original utterance 110 into a reduced vague utterance 232. The reduced vague utterance 232 is rewritten, replacing the precise components with placeholders and leaving only a resulting vague segment.

For example, the "discontinued products under $30" segment may be replaced with the placeholder "products" (e.g., as that precise segment represents some subset of products) and the "Chicago stores" may be replaced with the placeholder "stores" (e.g., as that precise segment represents some subset of stores). As such, the original utterance 110 may be rewritten into the reduced vague utterance 232 "Which {products} should we restock in {stores}?" (where, for purposes of illustration, curly braces are used here to visually identify the replaced segments).

As such, the hybrid interpreter 134 has identified two partial precise utterances 214 and one reduced vague utterance 232. The hybrid interpreter 134 uses the symbolic AI interpreter 132 to generate partial precise interpretations 220 for each of the partial precise utterances 214 (e.g., similar to how the federator module 130 uses the symbolic AI interpreter 132 to generate interpretations 138A from purely precise utterances 110 of FIG. 1). Further, the hybrid interpreter 134 uses the statistical AI interpreter 136 to generate reduced utterance interpretations 240 from the reduced vague utterance 232 (e.g., similar to how the federator module 130 uses the statistical AI interpreter 136 to generate interpretations 138C from purely vague utterances 110 of FIG. 1).

An interpretation merger module 250 then uses the reduced utterance interpretations 240 and the partial precise interpretations 220 to generate a complete interpretation 252. More specifically, the interpretation merger module 250 uses the original utterance 110 as a template and constructs the complete interpretation 252 by substituting the partial precise interpretations 220 into their respective places within the reduced utterance interpretation 240 (e.g., based on the placeholders inserted when creating the reduced vague utterance 232). In some examples, each individual partial precise utterance 214 can yield multiple partial precise interpretations 220. Similarly, each individual reduced vague utterance 232 can result in multiple reduced utterance interpretations 240. The interpreters 132, 136 may include internal scoring of each of the interpretations 220, 240 and may include a ranking module (e.g., similar to ranking module 140 of FIG. 1) that may filter out low scoring interpretations 220, 240 (e.g., based on a threshold).

For example, presume the reduced vague utterance 232 of "Which {products} should we restock in {stores}?" was converted into the reduced utterance interpretation 240 of "Which {products} have the highest price minus cost in each {store}?" Combining this reduced utterance interpretation 240 with the partial precise interpretations 220 results in the complete interpretation 252 being "Which discontinued products with a price under $30 have the highest price minus cost in each Chicago store?"

Unlike other approaches that put the statistical AI interpreter 136 in control of recognizing precise parts, the example hybrid interpreter 134 pre-interprets the precise segments using the symbolic AI interpreter 132 (e.g., as that interpreter 132 excels at handling precise utterances) and uses the statistical AI interpreter 136 for only the vague portions, thereby reducing errors that may be caused by using only the symbolic AI interpreter 132 or only the statistical AI interpreter 136 on the utterance 110.

Figure 3:
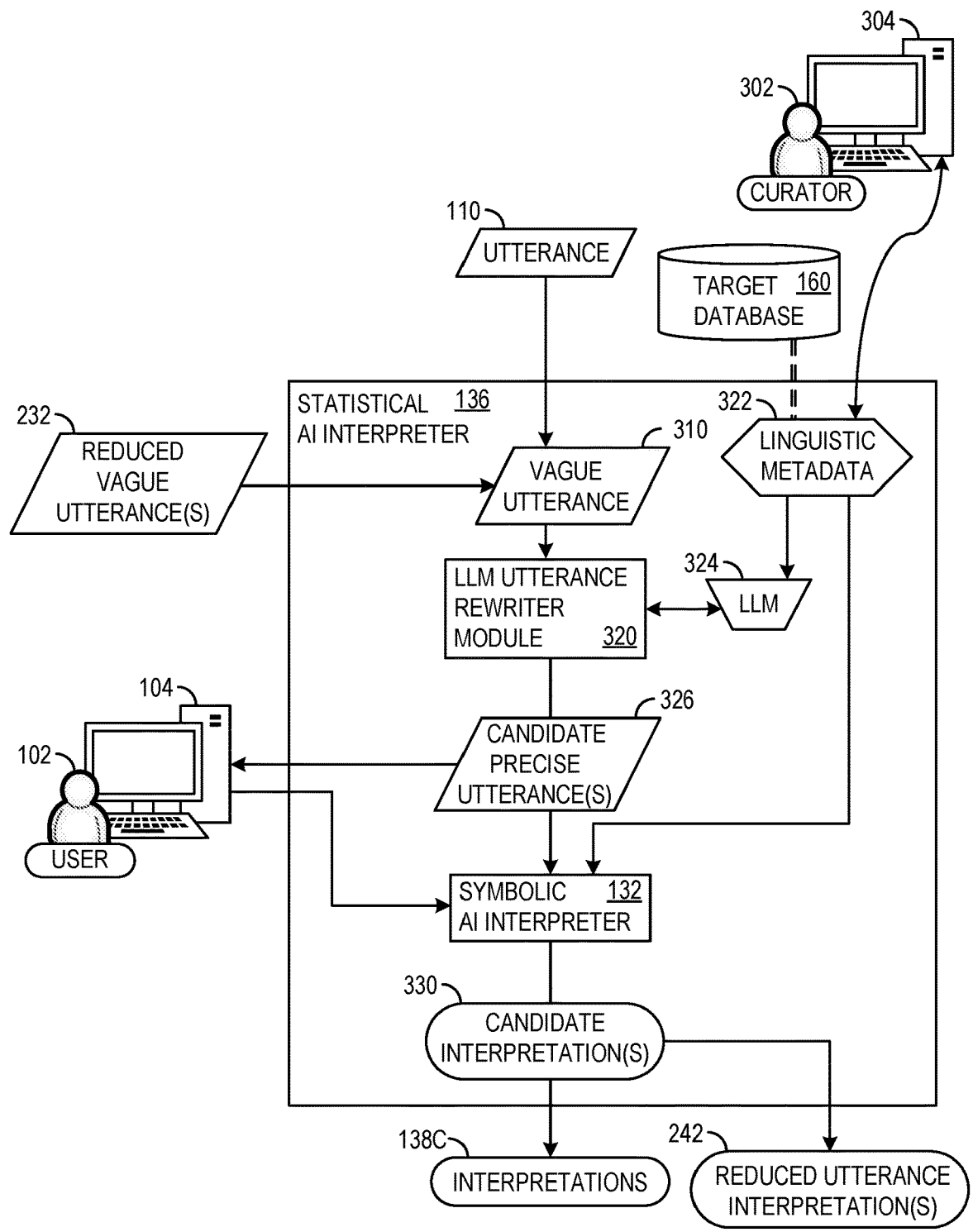
FIG. 3 is a diagram illustrating component-level details and dataflow within example statistical artificial intelligence (AI) interpreters, such as that of FIG. 1.

FIG. 3 is a diagram illustrating component-level details and dataflow within the example statistical AI interpreter 136 of FIG. 1. In this example, the effectiveness of the statistical AI interpreter 136 is improved through the use of an LLM utterance rewriter module 320 that uses a large language model (LLM) 324, in conjunction with linguistic metadata 322 about the target database 160, to generate precise questions (e.g., candidate precise utterances 326) from vague utterances.

The traditional approach taken by statistical AI interpreters is to train the system using a large number of utterances paired with their expected interpretations (or queries). This training enables a new utterance to be translated directly into a candidate interpretation. This approach, however, does not necessarily provide predictability, explainability, and control.

In the example, coupling features of the LLM 324 with the symbolic AI interpreter 132 provides an opportunity to get the best of both worlds, utilizing the inherent flexibility of the LLM 324 to rewrite vague questions (e.g., vague utterance 310) into precise utterances that can be handled by the symbolic AI interpreter 132. In some examples, the original utterance 110 is a purely vague utterance that is passed to the statistical AI interpreter 136 as shown in FIG. 1 and is treated as the vague utterance 310 shown here. In other examples, the reduced vague utterance 232 shown in FIG. 2 is passed to the statistical AI interpreter 136 as shown in FIG. 2 and is treated as the vague utterance 310 that is processed by the LLM utterance rewriter module 320.

The LLM utterance rewriter module 320, in the example, uses linguistic metadata 322 as primer for the LLM 324 (e.g., mapping terminology to objects and relationships within the target database 160). Linguistic metadata 322 is configured and edited by a curator 302 (e.g., via curator computing device 304) and may be customized by the curator 302 based on, for example, database context such as the structure of the target database 160 (e.g., database schema), the contents of that database 160, data instance term information matched from the utterance, other linguistic schema information, and vocabulary corresponding to core system capabilities of the symbolic AI interpreter (e.g., "average", "sort", "have", or the like), some or all of which may be changed based on feedback from users 102.

Such linguistic metadata 322 can include, for example, simple cases like mapping the word "customer" to the "CustInfo" table, to specialized domain-specific vocabulary such as mapping the term "heat transfer coefficient" to the "Component. InfHTC" field. Beyond simple term/synonym mapping, the linguistic metadata 322 may also define linguistic relationships between objects in the database 160. For example, the relationship "Employees sell customers products on order dates" is embodied in an "Orders" table of the database 160 and the relationship between a "Products" table and a "Price" field can be described as "Prices indicate how expensive/cheap products are." By defining both synonyms and relationships, the model author has extensive control over how questions are interpreted within the context of the model.

In some examples, the linguistic metadata 322 can be edited or supplemented based on feedback from the user 102. For example, if the user 102 inputs a question "Which customers bought cheese last week?" and the statistical AI interpreter 136 generated a response that showed which customers returned cheese last week, then the LLM 324 is not properly interpreting the word "buy" in this context. As such, the curator 302 may supplement the linguistic metadata 322 with the phrase "customers buy products," and that these transactions are stored in the "Orders" table, thus biasing the LLM 324 to use this particular relationship between customers and products and the source of such data within the target database 160. As such, this creates a feedback loop between outputs generated and improvements to the system 100.

The LLM utterance rewriter module 320 uses the vague utterance 310, in conjunction with the linguistic metadata 322, as input to prompt the LLM 324 to generate the candidate precise utterance(s) 326. These candidate precise utterances 326 may presented to the submitting user 102 for clarification of the vague utterance or for selection of a particular candidate precise utterance 326. These one or more candidate precise utterance(s) 326 are then sent to the symbolic AI interpreter 132 to generate candidate interpretations 330. In some examples, the linguistic metadata 322 may also be used by the symbolic AI interpreter 132 (e.g., to interpret each of the candidate precise utterances 326 generated by the LLM 324), and may be scored and the best utterances 326 being selected as the candidate interpretations 330. These candidate interpretations 330 may then become the interpretations 138C (e.g., provided as response to the purely vague utterance 110 of FIG. 1) or as the reduced utterance interpretation(s) 242 (e.g., provided as response to the reduced vague utterance(s) 232 of FIG. 2).

Figure 4:
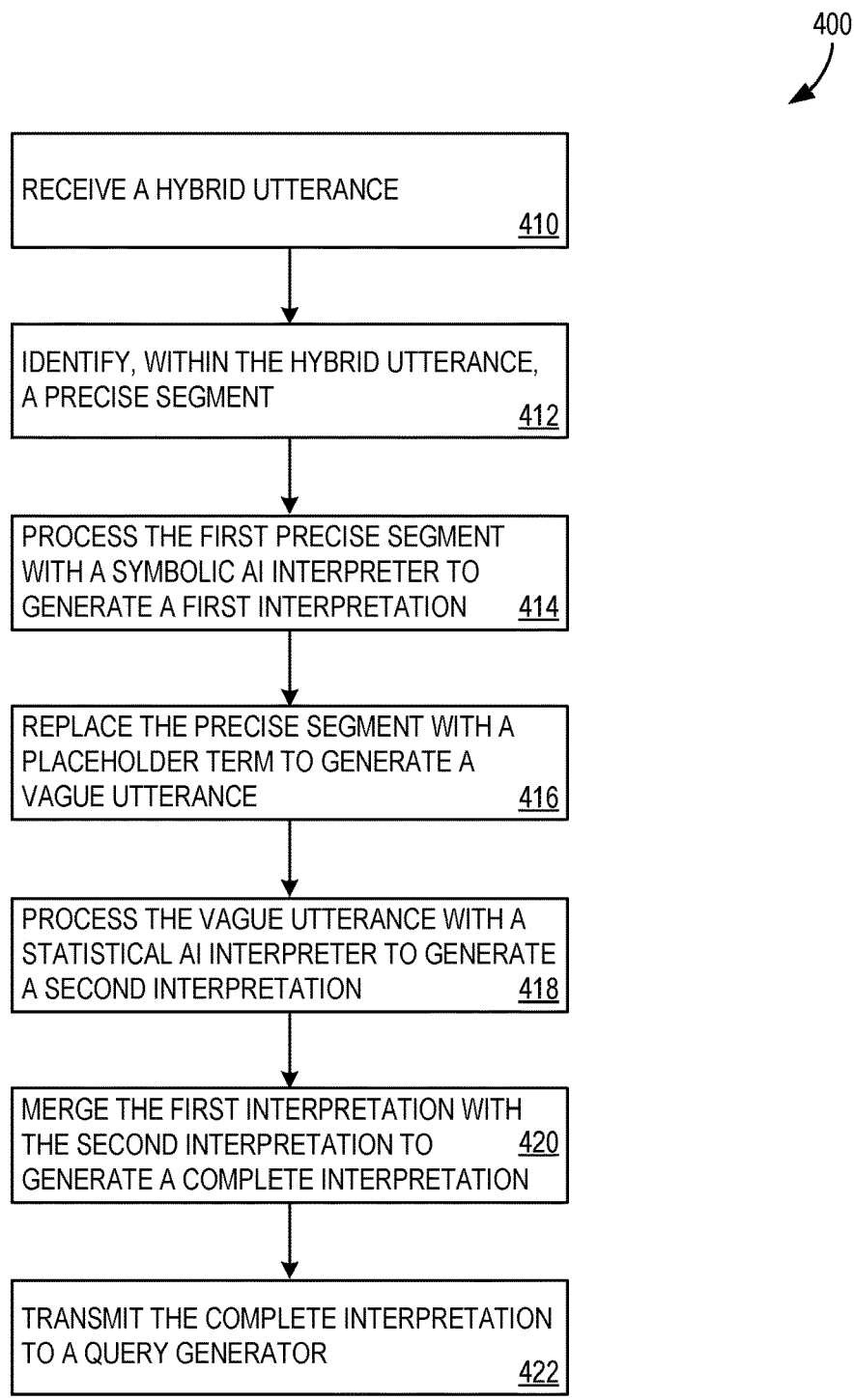
FIG. 4 is a flowchart illustrating exemplary operations that may be performed by the NLQ system for providing a hybrid architecture in natural language query processing.

FIG. 4 is a flowchart 400 illustrating exemplary operations that may be performed by the NLQ system 100 for providing a hybrid architecture in natural language query processing. In some examples, the operations of flowchart 400 may be similar to the operations described in FIG. 2 and FIG. 3. In the example implementation, the operations of flowchart 400 are performed by the NLQ device 120 of FIG. 1. At operation 410, the NLQ device 120 receives a hybrid utterance (e.g., utterance 110), the hybrid utterance being a natural language query request for data from a data source (e.g., the target database 160). At operation 412, the NLQ device 120 identifies, within the hybrid utterance, a first precise segment (e.g., partial precise utterance 214). At operation 414, the NLQ device 120 processes the first precise segment with a symbolic artificial intelligence (AI) interpreter (e.g., symbolic AI interpreter 132) that is configured to generate a first interpretation (e.g., partial precise interpretation 220).

In the example, at operation 416, the NLQ device 120 replaces the first precise segment, within the hybrid utterance, with a placeholder term, thereby resulting in a first vague utterance (e.g., reduced vague utterance 232). At operation 418, the NLQ device 120 processes the first vague utterance with a statistical AI interpreter (e.g., statistical AI interpreter 136) that is configured to generate a second interpretation (e.g., reduced utterance interpretation 240). In some examples, processing the first vague utterance with a statistical AI interpreter further includes submitting a prompt to a large language model (LLM) (e.g., LLM 324) that includes the first vague utterance and at least one component of linguistic metadata associated with the data source, receiving, from the LLM, one or more candidate precise utterances, processing the candidate precise utterances with the symbolic AI interpreter, thereby generating one or more candidate interpretations, and selecting one of the candidate interpretations as the second interpretation. In some examples, processing the first vague utterance with a statistical AI interpreter further includes causing the candidate precise utterances to be displayed on a user computing device and receiving user input indicating a selected candidate precise utterance, wherein processing the candidate precise utterances includes processing the selected candidate precise utterance with the symbolic AI interpreter, thereby generating a first candidate interpretation. In some examples, the linguistic metadata defines a relationship between first and second components of the data source, wherein the vague utterance identifies at least one of the first and second components, wherein at least one of the candidate precise utterances identifies at least the other of the first and second components.

At operation 420, the NLQ device 120 merges the first interpretation with the second interpretation, the merge using the hybrid utterance as a template for the merge and using the placeholder term as location for the first interpretation within the second interpretation, thereby generating a complete interpretation (e.g., complete interpretation 252). In some examples, merging further comprises replacing the placeholder term within the second interpretation with the first interpretation to generate the complete interpretation. At operation 422, in the example, the NLQ device 120 transmits the complete interpretation to a query generator (e.g., query generator module 150), the query generator being configured to generate at least one database query (e.g., database query 152) for the data source to generate query results (e.g., query results 162) that are displayed in response to the natural language query request.

In some examples, the NLQ device 120 also generates the one database query for the data source, transmits the database query to the data source for processing, receives, from the data source, query results for the database query, and causes the query results to be displayed on a user computing device (e.g., user computing device 104).

In some examples, the NLQ device 120 also identifies one or more ambiguous segments of the utterance, causing a plurality of unambiguous interpretations to be displayed on a user computing device based on the ambiguous segments, receives a user selection of a first unambiguous interpretation, and modifies the hybrid utterance to replace at least one of the ambiguous segments with an unambiguous segment based on the user selection.

Additional Examples

In some examples, the hybrid NLQ processing techniques described herein leverage both statistical AI interpreters and symbolic AI interpreters to process hybrid natural language queries better than some other known methods, and thus provide an improvement in a technical field by using such a combined approach.

An example natural language query system comprises: a processor; and a computer-readable medium storing instructions that are operative upon execution by the processor to: receive a hybrid utterance, the hybrid utterance being a natural language query request for data from a data source; identify, within the hybrid utterance, a first precise segment: process the first precise segment with a symbolic artificial intelligence (AI) interpreter that is configured to generate a first interpretation: replace the first precise segment, within the hybrid utterance, with a placeholder term, thereby resulting in a first vague utterance; process the first vague utterance with a statistical AI interpreter that is configured to generate a second interpretation: merge the first interpretation with the second interpretation, the merge using the hybrid utterance as a template for the merge and using the placeholder term as location for the first interpretation within the second interpretation, thereby generating a complete interpretation; and transmit the complete interpretation to a query generator, the query generator being configured to generate at least one database query for the data source to generate query results that are displayed in response to the natural language query request.

An example method comprises: receiving a hybrid utterance, the hybrid utterance being a natural language query request for data from a data source: identifying, within the hybrid utterance, a first precise segment: processing the first precise segment with a symbolic artificial intelligence (AI) interpreter that is configured to generate a first interpretation: replacing the first precise segment, within the hybrid utterance, with a placeholder term, thereby resulting in a first vague utterance: processing the first vague utterance with a statistical AI interpreter that is configured to generate a second interpretation; merging the first interpretation with the second interpretation, the merge using the hybrid utterance as a template for the merge and using the placeholder term as location for the first interpretation within the second interpretation, thereby generating a complete interpretation; and transmitting the complete interpretation to a query generator, the query generator being configured to generate at least one database query for the data source to generate query results that are displayed in response to the natural language query request.

An example computer storage device has computer-executable instructions stored thereon, which, on execution by a computer, cause the computer to perform operations comprising: receiving a hybrid utterance, the hybrid utterance being a natural language query request for data from a data source: identifying, within the hybrid utterance, a first precise segment: processing the first precise segment with a symbolic artificial intelligence (AI) interpreter that is configured to generate a first interpretation: replacing the first precise segment, within the hybrid utterance, with a placeholder term, thereby resulting in a first vague utterance: processing the first vague utterance with a statistical AI interpreter that is configured to generate a second interpretation: merging the first interpretation with the second interpretation, the merge using the hybrid utterance as a template for the merge and using the placeholder term as location for the first interpretation within the second interpretation, thereby generating a complete interpretation; and transmitting the complete interpretation to a query generator, the query generator being configured to generate at least one database query for the data source to generate query results that are displayed in response to the natural language query request.

Alternatively, or in addition to the other examples described herein, examples include any combination of the following:
    receiving a hybrid utterance;
    a hybrid utterance that includes at least one vague component and at least one precise component;
    a hybrid utterance being a natural language query request for data from a data source;

a data source is a database;
identifying, within the hybrid utterance, a precise segment;
processing the precise segment with a symbolic artificial intelligence (AI) interpreter;
a symbolic AI interpreter that is configured to generate interpretations;
replacing a precise segment, within a hybrid utterance, with a placeholder term, thereby resulting in a vague utterance;
processing a vague utterance with a statistical AI interpreter;
a statistical AI interpreter that is configured to generate interpretations;
merging a first interpretation with a second interpretation;
a merge that uses a hybrid utterance as a template for the merge and uses a placeholder term as location for the first interpretation within the second interpretation, thereby generating a complete interpretation;
transmitting a complete interpretation to a query generator;
a query generator being configured to generate at least one database query for a data source to generate query results;
displaying query results in response to a natural language query request;
generating at least one database query for a data source;
transmitting at least one database query to the data source for processing;
receiving, from the data source, query results for the at least one database query;
causing the query results to be displayed on a user computing device;
replacing a placeholder term within the second interpretation with the first interpretation to generate the complete interpretation;
identifying one or more ambiguous segments of an utterance;
causing a plurality of unambiguous interpretations to be displayed on a user computing device based on the one or more ambiguous segments;
receiving a user selection of a first unambiguous interpretation;
modifying the hybrid utterance to replace at least one of the ambiguous segments with an unambiguous segment based on the user selection;
submitting a prompt to a large language model (LLM) that includes a vague utterance;
submitting a prompt to a large language model (LLM) that includes at least one component of linguistic metadata associated with the data source;
submitting a prompt to a large language model (LLM) that includes a vague utterance and at least one component of linguistic metadata associated with the data source;
receiving, as output from an LLM, one or more candidate precise utterances;
processing the one or more candidate precise utterances with a symbolic AI interpreter, thereby generating one or more candidate interpretations;
selecting one of the one or more candidate interpretations as the second interpretation;
causing the one or more candidate precise utterances to be displayed on a user computing device;
receiving user input indicating a selected candidate precise utterance;
processing the selected candidate precise utterance with the symbolic AI interpreter, thereby generating a first candidate interpretation;
linguistic metadata that defines a relationship between first and second components of the data source;
a vague utterance identifies at least one of the first and second components; and
a candidate precise utterance identifies at least the other of the first and second components.

While the aspects of the disclosure have been described in terms of various examples with their associated operations, a person skilled in the art would appreciate that a combination of operations from any number of different examples is also within scope of the aspects of the disclosure.

Example Operating Environment

Figure 5:
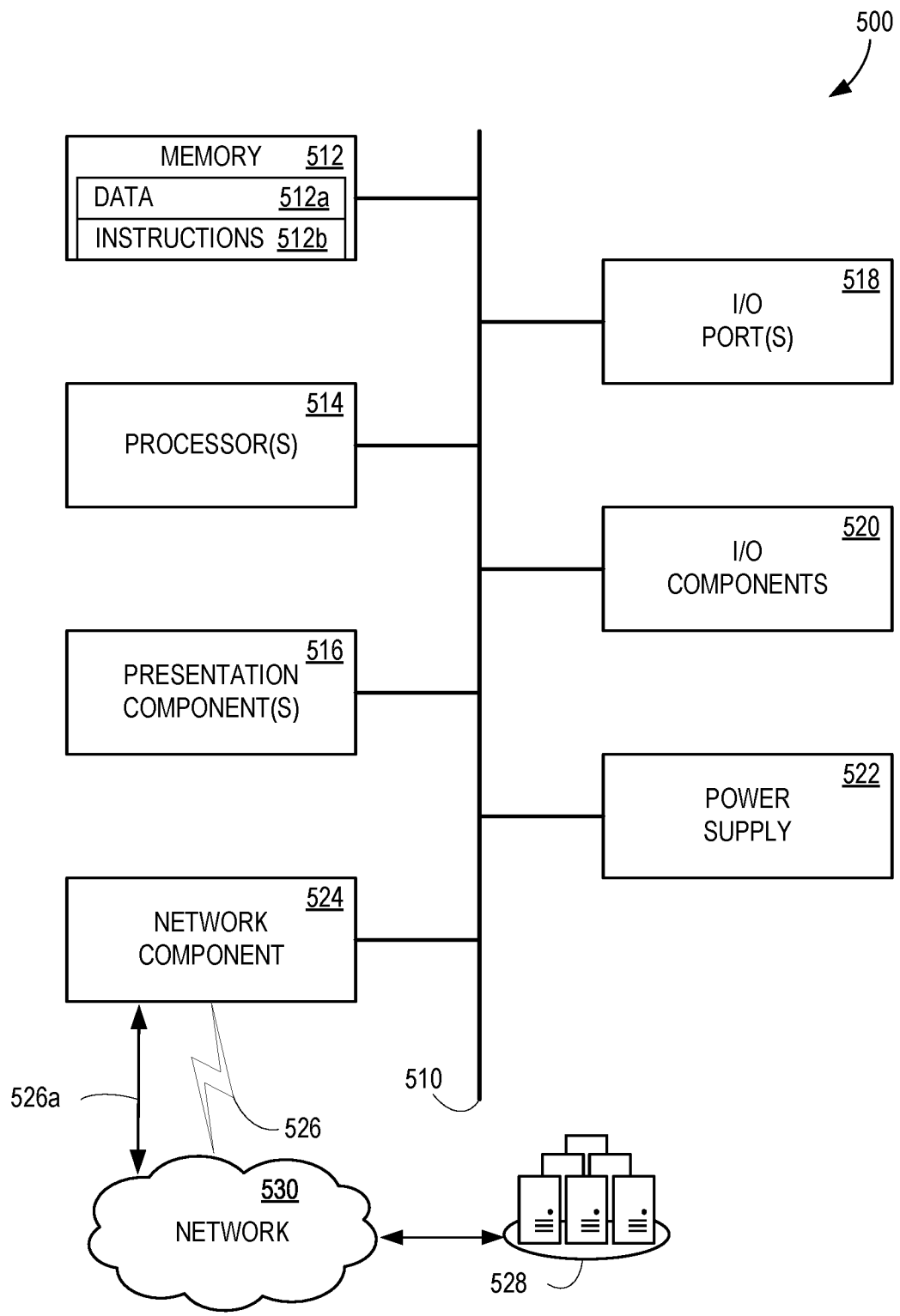
FIG. 5 is a block diagram of an example computing device (e.g., a computer storage device) for implementing aspects disclosed herein, and is designated generally as a computing device.

FIG. 5 is a block diagram of an example computing device 500 (e.g., a computer storage device) for implementing aspects disclosed herein, and is designated generally as computing device 500. In some examples, one or more computing devices 500 are provided for an on-premises computing solution. In some examples, one or more computing devices 500 are provided as a cloud computing solution. In some examples, a combination of on-premises and cloud computing solutions are used. Computing device 500 is but one example of a suitable computing environment that can be used in the NLQ system 100 (e.g., as NLQ device 120) and is not intended to suggest any limitation as to the scope of use or functionality of the examples disclosed herein, whether used singly or as part of a larger set. Neither should computing device 500 be interpreted as having any dependency or requirement relating to any one or combination of components/modules illustrated.

The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 500 includes a bus 510 that directly or indirectly couples the following devices: computer storage memory 512, one or more processors 514, one or more presentation components 516, input/output (I/O) ports 518, I/O components 520, a power supply 522, and a network component 524. While computing device 500 is depicted as a seemingly single device, multiple computing devices 500 may work together and share the depicted device resources. For example, memory 512 may be distributed across multiple devices, and processor(s) 514 may be housed with different devices.

Bus 510 represents what may be one or more busses (such as an address bus, data bus, or a combination thereof). Although the various blocks of FIG. 5 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 5 and the references herein to a "computing device." Memory 512 may take the form of the computer storage media referenced below and operatively provide storage of computer-readable instructions, data structures, program modules and other data for the computing device 500. In some examples, memory 512 stores one or more of an operating system, a universal application platform, or other program modules and program data. Memory 512 is thus able to store and access data 512a and instructions 512b that are executable by processor 514 and configured to carry out the various operations disclosed herein.

In some examples, memory 512 includes computer storage media. Memory 512 may include any quantity of memory associated with or accessible by the computing device 500. Memory 512 may be internal to the computing device 500 (as shown in FIG. 5), external to the computing device 500 (not shown), or both (not shown). Additionally, or alternatively, the memory 512 may be distributed across multiple computing devices 500, for example, in a virtualized environment in which instruction processing is carried out on multiple computing devices 500. For the purposes of this disclosure, "computer storage media," "computer-storage memory," "memory," and "memory devices" are synonymous terms for the computer-storage memory 512, and none of these terms include carrier waves or propagating signaling.

Processor(s) 514 may include any quantity of processing units that read data from various entities, such as memory 512 or I/O components 520. Specifically, processor(s) 514 are programmed to execute computer-executable instructions for implementing aspects of the disclosure. The instructions may be performed by the processor, by multiple processors within the computing device 500, or by a processor external to the client computing device 500. In some examples, the processor(s) 514 are programmed to execute instructions such as those illustrated in the flow charts discussed below and depicted in the accompanying drawings. Moreover, in some examples, the processor(s) 514 represent an implementation of analog techniques to perform the operations described herein. For example, the operations may be performed by an analog client computing device 500 and/or a digital client computing device 500. Presentation component(s) 516 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 500, across a wired connection, or in other ways. I/O ports 518 allow computing device 500 to be logically coupled to other devices including I/O components 520, some of which may be built in. Example I/O components 520 include, for example but without limitation, a microphone, joystick, game pad, satellite dish, scanner, printer, wireless device, etc.

Computing device 500 may operate in a networked environment via the network component 524 using logical connections to one or more remote computers. In some examples, the network component 524 includes a network interface card and/or computer-executable instructions (e.g., a driver) for operating the network interface card. Communication between the computing device 500 and other devices may occur using any protocol or mechanism over any wired or wireless connection. In some examples, network component 524 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 524 communicates over wireless communication link 526 and/or a wired communication link 526a to a remote resource 528 (e.g., a cloud resource) across network 530. Various different examples of communication links 526 and 526a include a wireless connection, a wired connection, and/or a dedicated link, and in some examples, at least a portion is routed through the internet.

Although described in connection with an example computing device 500, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure do not include signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A natural language query system comprising:
a processor; and
a computer-readable medium storing instructions that are operative upon execution by the processor to:
receive a hybrid utterance, the hybrid utterance being a natural language query request for data from a data source;
identify, within the hybrid utterance, a first precise segment;
process the first precise segment with a symbolic artificial intelligence (AI) interpreter that is configured to output a first interpretation;
replace the first precise segment, within the hybrid utterance, with a placeholder term, thereby resulting in a first vague utterance;
process the first vague utterance with a statistical AI interpreter that is configured to output a second interpretation;
merge the first interpretation output from the symbolic AI interpreter with the second interpretation output from the statistical AI interpreter, the merger using (i) the hybrid utterance as a template for the merger and (ii) the placeholder term as a location for the first interpretation within the second interpretation, thereby generating a complete interpretation; and
transmit the complete interpretation to a query generator, the query generator being configured to generate a database query for the data source to generate query results that are displayed in response to the natural language query request.

2. The natural language query system of claim 1, wherein the instructions are further operative to:
generate the database query for the data source;
transmit the database query to the data source for processing;
receive, from the data source, query results for the database query; and
cause the query results to be displayed on a user computing device.

3. The natural language query system of claim 1, wherein the merger further comprises replacing the placeholder term within the second interpretation with the first interpretation to generate the complete interpretation.

4. The natural language query system of claim 1, wherein the instructions are further operative to:
identify an ambiguous segment of the utterance;
cause a plurality of unambiguous interpretations to be displayed on a user computing device based on the ambiguous segment;
receive a user selection of a first unambiguous interpretation; and
modify the hybrid utterance to replace at least one of the ambiguous segments with an unambiguous segment based on the user selection.

5. The natural language query system of claim 1, wherein processing the first vague utterance with a statistical AI interpreter further comprises:
submitting a prompt to a large language model (LLM) that includes the first vague utterance and a component of linguistic metadata associated with the data source;
receiving, from the LLM, candidate precise utterances;
processing the candidate precise utterances with the symbolic AI interpreter, thereby generating candidate interpretations; and
selecting one of the candidate interpretations as the second interpretation.

6. The natural language query system of claim 5, wherein processing the first vague utterance with a statistical AI interpreter further comprises:
causing the candidate precise utterances to be displayed on a user computing device; and
receiving user input indicating a selected candidate precise utterance,
wherein processing the candidate precise utterances includes processing the selected candidate precise utterance with the symbolic AI interpreter, thereby generating a first candidate interpretation.

7. The natural language query system of claim 5, wherein the linguistic metadata defines a relationship between first and second components of the data source, wherein the vague utterance identifies at least one of the first and second components, wherein at least one of the candidate precise utterances identifies at least the other of the first and second components.

8. A computer-implemented method comprising:
  receiving a hybrid utterance, the hybrid utterance being a natural language query request for data from a data source;
  identifying, within the hybrid utterance, a first precise segment;
  processing the first precise segment with a symbolic artificial intelligence (AI) interpreter that is configured to generate a first interpretation;
  replacing the first precise segment, within the hybrid utterance, with a placeholder term, thereby resulting in a first vague utterance;
  processing the first vague utterance with a statistical AI interpreter that is configured to generate a second interpretation, wherein processing the first vague utterance with the statistical AI interpreter comprises processing candidate precise utterances with the symbolic AI interpreter;
  merging the first interpretation with the second interpretation, the merger using the hybrid utterance as a template for the merge and using the placeholder term as a location for the first interpretation within the second interpretation, thereby generating a complete interpretation; and
  transmitting the complete interpretation to a query generator, the query generator being configured to generate a database query for the data source to generate query results that are displayed in response to the natural language query request.

9. The computer-implemented method of claim 8, further comprising:
  generating the database query for the data source;
  transmitting the database query to the data source for processing;
  receiving, from the data source, query results for the database query; and
  causing the query results to be displayed on a user computing device.

10. The computer-implemented method of claim 8, wherein the merger further comprises replacing the placeholder term within the second interpretation with the first interpretation to generate the complete interpretation.

11. The computer-implemented method of claim 8, further comprising:
  identifying an ambiguous segment of the utterance;
  causing unambiguous interpretations to be displayed on a user computing device based on the ambiguous segment;
  receiving a user selection of a first unambiguous interpretation; and
  modifying the hybrid utterance to replace at least one of the ambiguous segments with an unambiguous segment based on the user selection.

12. The computer-implemented method of claim 8, wherein processing the first vague utterance with a statistical AI interpreter further comprises:
  submitting a prompt to a large language model (LLM) that includes the first vague utterance and a component of linguistic metadata associated with the data source;
  receiving, from the LLM, the candidate precise utterances;
  processing the candidate precise utterances with the symbolic AI interpreter, thereby generating candidate interpretations; and
  selecting one of the candidate interpretations as the second interpretation.

13. The computer-implemented method of claim 12, wherein processing the first vague utterance with a statistical AI interpreter further comprises:
  causing the candidate precise utterances to be displayed on a user computing device; and
  receiving user input indicating a selected candidate precise utterance,
  wherein processing the candidate precise utterances includes processing the selected candidate precise utterance with the symbolic AI interpreter, thereby generating a first candidate interpretation.

14. The computer-implemented method of claim 12, wherein the linguistic metadata defines a relationship between first and second components of the data source, wherein the vague utterance identifies at least one of the first and second components, wherein at least one of the candidate precise utterances identifies at least the other of the first and second components.

15. A computer storage device having computer-executable instructions stored thereon, which, on execution by a computer, cause the computer to perform operations comprising:
  receiving a hybrid utterance, the hybrid utterance being a natural language query request for data from a data source;
  identifying, within the hybrid utterance, a first precise segment;
  processing the first precise segment with a symbolic artificial intelligence (AI) interpreter that is configured to output a first interpretation;
  replacing the first precise segment, within the hybrid utterance, with a placeholder term, thereby resulting in a first vague utterance;
  processing the first vague utterance with a statistical AI interpreter that is configured to output a second interpretation;
  merging the first interpretation output from the symbolic AI interpreter with the second interpretation output from the statistical AI interpreter, the merger using the hybrid utterance as a template for the merge and using the placeholder term as a location for the first interpretation within the second interpretation, thereby generating a complete interpretation; and
  transmitting the complete interpretation to a query generator, the query generator being configured to generate a database query for the data source to generate query results that are displayed in response to the natural language query request.

16. The computer storage device of claim 15, further comprising:
  generating the database query for the data source;
  transmitting the database query to the data source for processing;
  receiving, from the data source, query results for the database query; and
  causing the query results to be displayed on a user computing device.

17. The computer storage device of claim 15, wherein the merging further comprises replacing the placeholder term within the second interpretation with the first interpretation to generate the complete interpretation.

18. The computer storage device of claim 15, further comprising:
  identifying an ambiguous segment of the utterance;

causing unambiguous interpretations to be displayed on a user computing device based on the ambiguous segment;

receiving a user selection of a first unambiguous interpretation; and modifying the hybrid utterance to replace at least one of the ambiguous segments with an unambiguous segment based on the user selection.

19. The computer storage device of claim 15, wherein processing the first vague utterance with a statistical AI interpreter further comprises:

submitting a prompt to a large language model (LLM) that includes the first vague utterance and a component of linguistic metadata associated with the data source;

receiving, from the LLM, candidate precise utterances;

processing the candidate precise utterances with the symbolic AI interpreter, thereby generating candidate interpretations; and selecting one of the candidate interpretations as the second interpretation.

20. The computer storage device of claim 19, wherein processing the first vague utterance with a statistical AI interpreter further comprises:

causing the candidate precise utterances to be displayed on a user computing device; and receiving user input indicating a selected candidate precise utterance, wherein processing the candidate precise utterances includes processing the selected candidate precise utterance with the symbolic AI interpreter, thereby generating a first candidate interpretation.

* * * * *